W. S. TUCKER.
SOUND DETECTING DEVICE.
APPLICATION FILED JAN. 6, 1919.

1,351,356.

Patented Aug. 31, 1920.
4 SHEETS—SHEET 1.

Inventor
W. S. Tucker.
By H. R. Kerslake
Atty.

W. S. TUCKER.
SOUND DETECTING DEVICE.
APPLICATION FILED JAN. 6, 1919.

1,351,356.

Patented Aug. 31, 1920.
4 SHEETS—SHEET 2.

Inventor.
W. S. Tucker.
By H. R. Kerslake
Atty

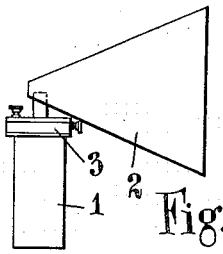
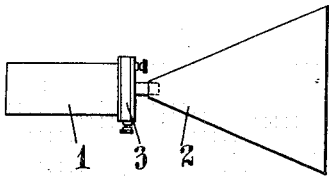
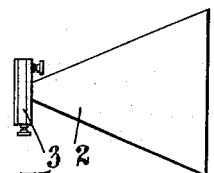
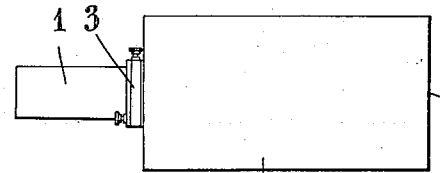
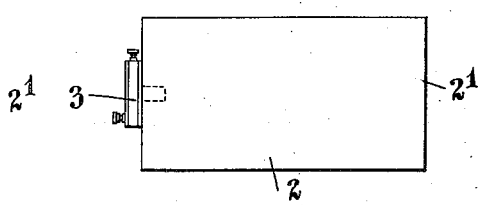
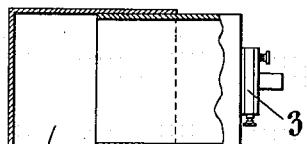
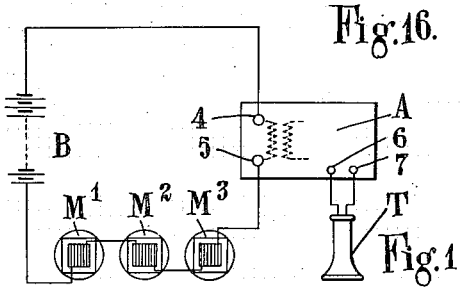
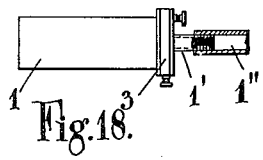
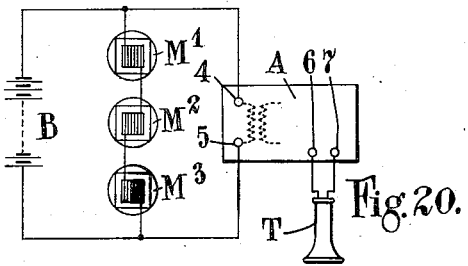
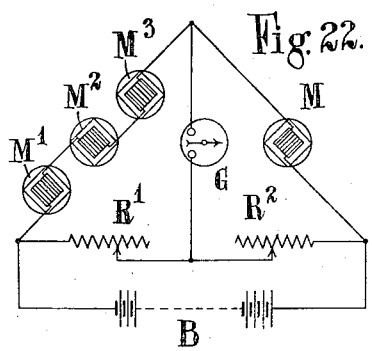
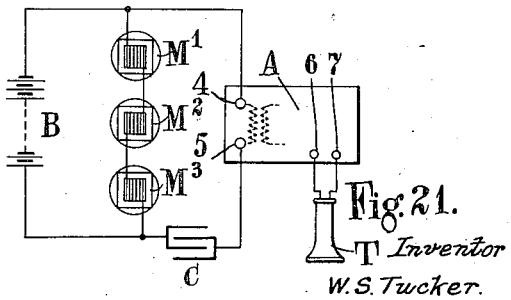

W. S. TUCKER.
SOUND DETECTING DEVICE.
APPLICATION FILED JAN. 6, 1919.

1,351,356.

Patented Aug. 31, 1920.
4 SHEETS—SHEET 4.

Inventor
W. S. Tucker.
By H. R. Kerslake
Atty

UNITED STATES PATENT OFFICE.

WILLIAM SANSOME TUCKER, OF THAMES DITTON, ENGLAND.

SOUND-DETECTING DEVICE.

1,351,356.  Specification of Letters Patent. Patented Aug. 31, 1920.

Application filed January 6, 1919. Serial No. 269,902.

*To all whom it may concern:*

Be it known that I, WILLIAM SANSOME TUCKER, a subject of the King of Great Britain and Ireland, and residing at Imber Court, Experimental Ground, Thames Ditton, in the county of Surrey, England, have invented certain new and useful Improvements in and Relating to Sound-Detecting Devices, of which the following is a specification.

This invention relates to an improved thermic sound detecting device intended more particularly for determining the position of the origin of a sound produced by the discharge of a gun, although the use of the improved sound detecting device is not limited to such determination or origin, the invention being applicable also to the detection and measurement of such sounds and also to sounds emanating from other origins than from a gun, and being generally useful also for other purposes such as for the measurement of velocity and consequently of the quantity of gases or liquids flowing through tubes or pipes.

Various difficulties have hitherto been encountered with the ordinary type of microphone when used for the purpose hereinbefore more particularly referred to, viz., in conjunction with a sound ranging apparatus for determining the position of a gun. The ordinary type of microphone is more sensitive with regard to sound waves produced by the shell traveling through the air than with regard to those of the actual discharge of the gun and consequently the position of the gun as obtained by means of such a microphone is not accurate and has to be corrected by calculation.

One object of the invention is to provide an improved sound detecting device which responds more readily to the gun report and which overcomes the drawback of having to resort to calculation for obtaining the true position of the gun, other advantages obtained by the use of the sound detecting device constructed according to the present invention being that:—Both gun and sound waves produced by the shell traveling through the air are recorded; a characteristic record is obtained for each sound so that the records produced by the same gun can easily be distinguished from each other and with sufficient experience it can even be ascertained what type of gun has been fired; the sensitiveness of the sound detecting device is constant, and the same does not respond to ordinary noises, nor is it affected by vibration, and it assumes its normal condition immediately after each vibration.

According to the present invention use is made of an electrically heated thin conductor in combination with a sound box and with means for producing a small blast of air past said conductor into the sound box by the effect of the sound or gun wave which it is desired to detect, measure, or record, such detection, measurement, or record being obtained by the variation in the resistance of said electrically heated conductor produced by the cooling effect of the blast upon the conductor.

According to one mode of carrying the invention hereinbefore referred to into effect, a very thin platinum or other suitable wire is mounted close to, preferably in front of or within a small opening which may be made of any desired shape and is provided in the side of a wooden or other box. The wire which may be supported in a suitable frame is connected to terminals and an electric current is passed through it for the purpose of raising its temperature above that of the surrounding air, the temperature of the wire being reduced by the cooling effect of the small blast of air thereon, which is caused by the sound to be determined or recorded.

In all heated conductors having a positive temperature co-efficient the electrical resistance will be reduced by the small blast of air and this variation will depend entirely upon the intensity of the wave and its period will remain constant. It will thus be seen that the record of each sound will show a characteristic wave form determined by the variation in the electrical resistance of the heated conductor.

The variation in the electrical resistance of the heated conductor may be detected and measured by means of an Einthoven string galvanometer or other suitable instrument and permanent records of gun waves or sounds in general may be obtained by means of photographic or other recording devices.

The electrical connections between the sound detecting device and the various detecting, measuring or recording devices may be effected in any suitable manner, either directly or through the intermediary of a suitable coupling, for instance through a transformer, the latter arrangement being especially useful when it is desired to use the sound detecting device as an automatic transmitter arranged some distance away from the recording instruments.

One mode of carrying the invention hereinbefore referred to into effect is illustrated, by way of example, in Figures 1–11 of the accompanying drawings.

Fig. 5 is a plan view of a modified form of construction of the support carrying the frame on which the thin conductor is mounted, while

Figs. 9 and 10 are a plan view and a sectional elevation of another detail respectively, while

Figs. 12 to 18 show largely diagrammatically different combined units of sound detecting device and acoustic resonator.

Figs. 19 to 25 illustrate various electrical connections.

Figure 1:
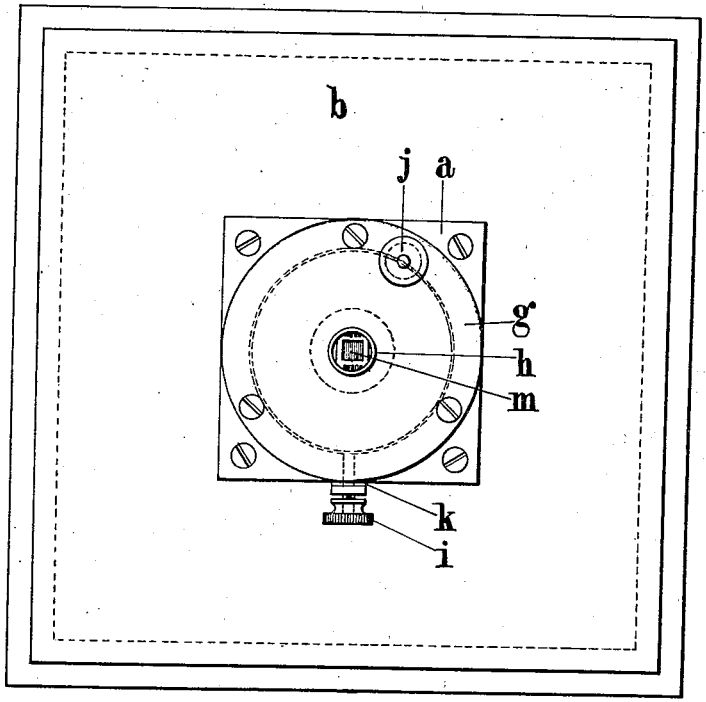
Figs. 1 and 2 are a plan view and a sectional elevation of the improved sound detecting device respectively.
Figure 2:
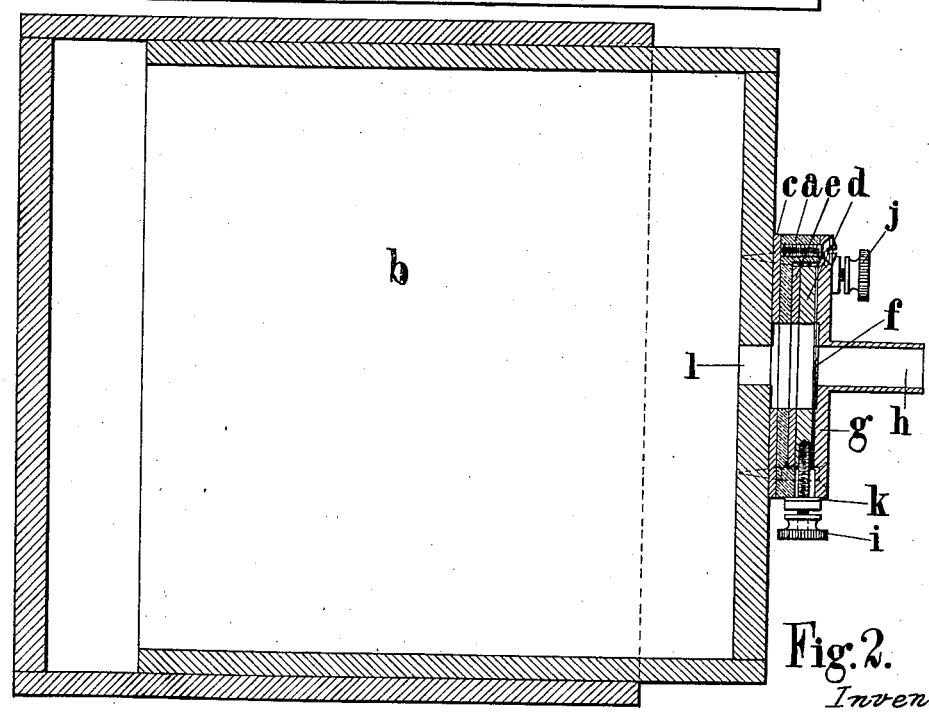

Referring to the drawings, Figs. 1 and 2, $a$ is a recessed frame of insulating material which is attached to the box $b$, preferably through the interposition of a sheet of india rubber $c$; $d$ is a metal disk which is mounted within the frame $a$, preferably through the interposition of an india rubber washer $e$; $f$ is a support carrying the frame on which the thin conductor is mounted, as hereinafter more particularly referred to in connection with Figs. 3, 4, 5 and 6; $g$ is another metal disk which is attached to the frame $a$ and is provided with a tubular extension $h$ through which the blast is produced; $i$ and $j$ are contact terminals which are provided on the metal disks $d$ and $g$ respectively, and $k$ is an insulating washer. The india rubber sheet $c$, the frame $a$, the india rubber washer $e$, the metal disk $d$, the support $f$ and the metal disk $g$ are provided with central holes to allow the passage of a current of air through the tubular extension $h$ provided on the metal disk $g$ and past the thin conductor, supported in or closely in front of, or behind the hole of the supporting disk $f$, into the box $b$, through a hole $l$ provided in the latter.

Figure 3:
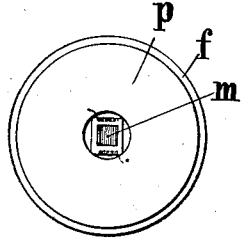
Fig. 3 is a plan view of the support on which the frame carrying the thin conductor is mounted.
Figure 4:
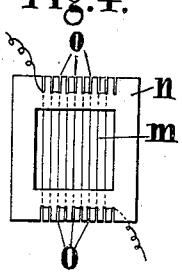
Fig. 4 is a plan view of the frame carrying the thin conductor.
Figure 7:
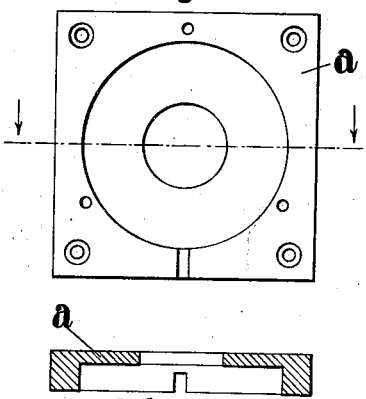
Figs. 7 and 8 are a plan view and a sectional elevation of one detail respectively.

Referring to Figs. 3 and 4, the thin conductor $m$ is preferably made of Wollaston wire, the silver coated platinum being wound on a small open mica frame $n$ preferably formed with teeth $o$, so that the thin conductor may conveniently be wound in a close zig-zag manner, as shown, all the windings lying in one and the same plane. The frame $n$ with the thin conductor wound thereon is stuck on or is otherwise attached to the support $f$, which consists of a thin disk of mica provided on each side with an electrode $p$ preferably consisting of a thin disk of silver stuck on or otherwise attached to the mica disk $f$, the arrangement being such that the thin conductor $m$ lies within or closely in front of, or behind the central hole in the disk $f$. The two ends of the thin conductor $m$ are soldered on to the two silver electrodes respectively.

The silver coating on that part of the Wollaston wire which lies in the opening of the frame and is intended to be exposed to the current of air is removed, by first coating the whole of the support $f$ with exception of the part of the wire from which the silver is to be removed, with a layer of wax and then dipping the support into nitric acid.

Figure 5:
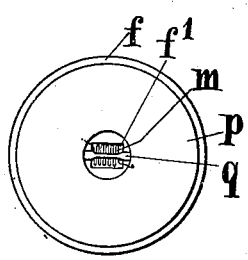
Figure 6:
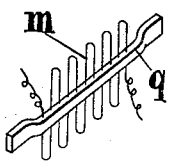
Fig. 6 is a perspective view of the frame shown in Fig. 5.
Figure 8:
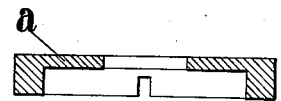

According to the modification illustrated in Figs. 5 and 6, the thin conductor $m$ is mounted in a zig-zag manner as shown between two strips or thin bars of insulating material attached to each other and forming a cross bar $q$ which is stuck on or is otherwise attached to the mica disk $f$ across the opening $f^1$ provided therein, so that the conductor $m$ shall lie within or closely in front of or behind the opening in the mica disk. The two ends of the conductor $m$ are connected to the two silver electrodes $p$ as in the arrangement described with reference to Figs. 4 and 5.

In both forms of construction hereinbefore described, the electrical connection of the thin conductor with the other parts of the circuit or circuits is effected through the two silver electrodes $p$ which are in metallic contact with the metal disks $d$ and $g$ provided with the contact terminals $i$ and $j$ respectively.

The box $b$ on which the sound detecting device hereinbefore described is attached may be formed of two parts which are mounted telescopically, as shown in Figs. 1 and 2, in order to vary the capacity of the box and thereby obtain a resonant effect.

Figure 11:
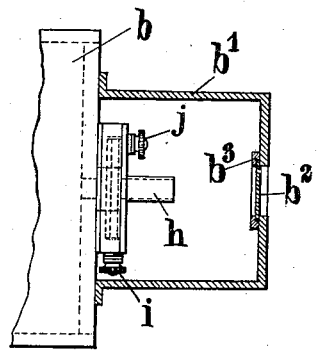
Fig. 11 illustrates a sub-aqueous sound detecting device.
Figure 9:
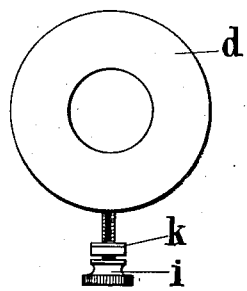
Figure 10:

The sound detecting device may also be used as a device for detecting sounds propagated through water, in which case an auxiliary box $b^1$ (see Fig. 11) may be attached to the side of the box $b$ carrying the sound detecting device, said auxiliary box being provided, preferably on the side facing the small opening and tubular extension $h$ through which the blast is produced, with a suitable diaphragm $b^2$ held in position by a ring $b^3$, by means of which diaphragm any vibrations imparted to the latter from the outside of the box will cause corresponding movements in the air blast past the heated conductor.

The electrical connections between the sound detecting device and the various detecting or equivalent devices are illustrated in connection with the second part of the invention hereinafter referred to.

According to a further feature of the present invention, use is made of a plurality of sound detecting devices, and more particularly of thermic sound detecting devices, each of which is combined with an acoustic resonator of a particular pitch in such a manner that a series of combined sound detecting device and acoustic resonators are obtained, the pitch of which extends along the whole range of acoustic vibrations, or along a portion of such range, according to the object in view.

The arrangement of sound detecting devices having the feature just referred to is more particularly useful in connection with the detection of sound, such as produced by aeroplanes, submarines, or other sources of sound; I wish it, however, to be understood that the invention is not limited to the detection of sound, as it may otherwise conveniently be used, e. g., for the transmission of sound. This part of the invention is diagrammatically illustrated in Figs. 12 to 25.

Referring to Figs. 12 to 16, each combined unit of sound detecting device and acoustic resonator may comprise an open or closed tubular resonator 1 in open communication with a trumpet, or open box 2, with the open end at $2^1$, and a thermic sound detecting device 3 inserted between the two, (see Figs. 12, 13 and 14), or a trumpet, or open box 2 with the open end at $2^1$ in combination with the sound detecting device 3, the tubular resonator 1 being dispensed with. (See Figs. 15 and 16.)

The tuning of each combined unit of sound detecting device and acoustic resonator to a particular pitch may be either fixed or adjustable; in either case the tuning being attained in a well known manner by the proper adjustment of the shape, length, and volume of the resonating chamber, or of the aperture near the grid of the thermic sound detecting device, or otherwise. Fig. 17 illustrates the method of tuning wherein the volume of the resonating chamber 1 is varied by a telescopic sliding movement, and Fig. 18 the method of tuning wherein the volume of the aperture near the grid of the thermic sound detecting device 3 is varied by a screwing movement, of the tubular extension $1'$ within a correspondingly screw-threaded member $1''$.

The electrical connection between the thermic sound detecting devices and the other part of the electrical apparatus may be effected in various ways.

In the arrangement illustrated in Fig. 19, the various sound detecting devices $M^1$, $M^2$, $M^3$ are connected in series with each other and with the battery B and the input terminals 4, 5 of the primary of the first stage transformer associated with an amplifier A, the output terminals 6, 7 of which are connected to a telephone T or equivalent device.

The arrangements illustrated in Figs. 20 and 21 differ from that shown in Fig. 19 by the sound detecting devices $M^1$, $M^2$, $M^3$ being arranged in parallel with the battery B and the input terminals 4, 5 of the amplifier; in the case of Fig. 21, a condenser C of suitable capacity is inserted in series with the terminals 4, 5.

Referring to Fig. 22, illustrating a Wheatstone bridge arrangement, $M^1$, $M^2$ $M^3$ are the active sound detecting devices under the influence of the sound which is to be detected, M is a balancing sound detecting device which is not under the influence of the said sound, $R^1$, $R^2$ are two adjustable resistances, G is a galvanometer and B the battery.

The Wheatstone bridge arrangement may also be used for discriminating between two sounds of different pitch. In this case the balancing sound detecting device may be rendered operative for a sound outside the range of $M^1$, $M^2$, $M^3$, thus indicating a high pitch aeroplane, as against a lower pitch one, which renders the sound detecting device $M^1$ operative, the deflections being to the right or to the left, according as to whether the sound comes from the one or the other aeroplane.

Figure 23:
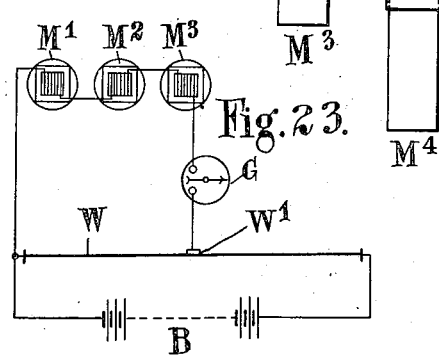

Referring to Fig. 23 illustrating the potentiometer method $M^1$, $M^2$, $M^3$ are the sound detecting devices, B the battery, W a wire resistance and G a galvanometer, one end of which is connected to a sliding contact $W^1$.

Figure 24:
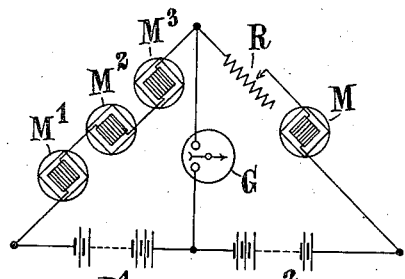

Fig. 24 illustrates a compensating arrangement, in which $M^1$, $M^2$, $M^3$ are the active sound detecting devices, M a balancing sound detecting device which is not under the influence of the sound to be detected, R a variable resistance, G a galvanometer and $B^1$, $B^2$ two batteries.

Figure 25:
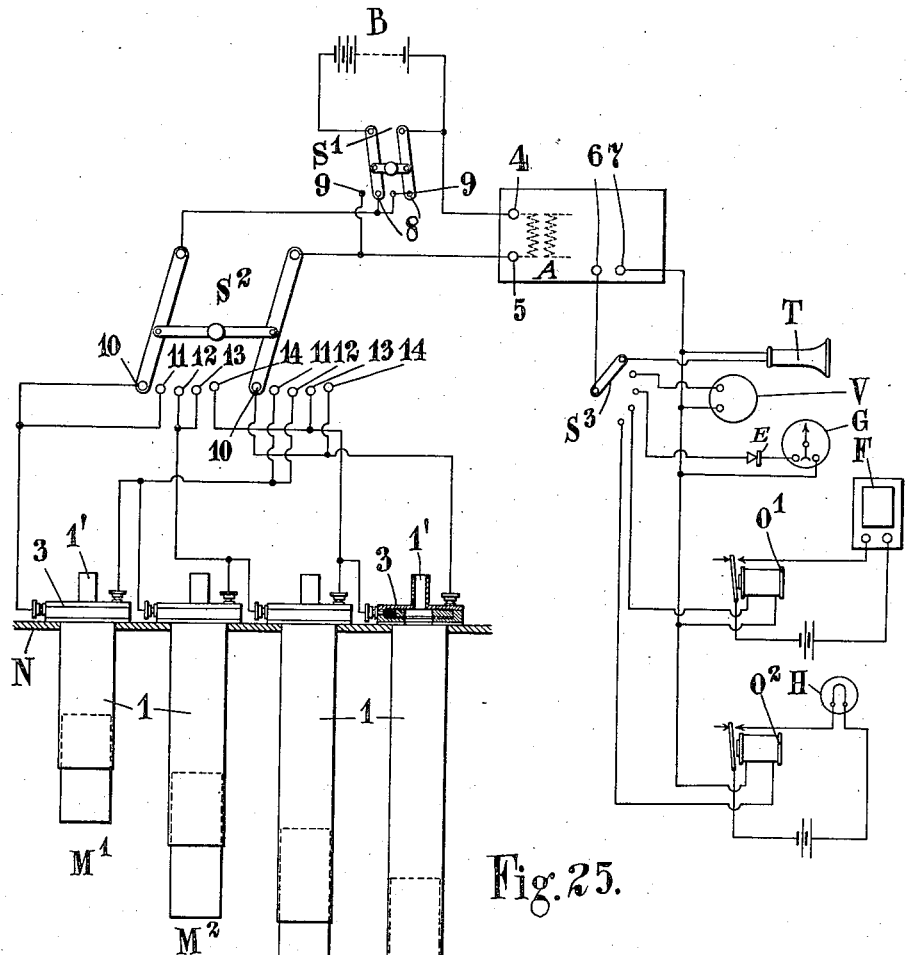

Referring to the complete arrangement illustrated in Fig. 25, $M^1$, $M^2$, $M^3$, $M^4$ are a plurality of combined units of sound detecting device and acoustic resonator, each comprising an open or closed tubular resonator 1 of adjustable length, and a thermic sound detecting device 3 provided with a tubular extension $1'$, as hereinbefore described. All these combined units, the number of which may be very large, are mounted on a suitable support N, each one of them being adjusted to a particular pitch, in order to obtain a range of acoustic vibrations which shall be as wide as possible. The electrical terminals of the various sound detecting devices are connected in series with one another, the two end terminals of the series of sound detecting devices being connected through the intermediary of two switches S¹, S², to the battery B and the input terminals 4, 5 of an amplifier A, the output terminals 6, 7 of which are adapted to be connected by means of a switch S³ to any one of a plurality of indicating or recording devices, viz., a telephone T, a vibration galvanometer V, a rectifying wave detector E associated with a direct reading galvanometer G, and through relays O¹, O²; to an electric bell F, or lamp H, it being understood that any other indicating or recording device may be used instead.

When the switch S¹ is in the position in which it makes contact with the contacts 8, 8, while switch S² is in the position shown in the figure, the sound detecting devices are connected in series with the battery and with the input terminals 4, 5 of the amplifier, and when it is shifted to the position in which it makes contact with the contacts 9, 9 while switch S² remains in the same position, the end terminals of the whole series of sound detecting devices are connected in parallel with the battery and the input terminals 4, 5 of the amplifier. When the switch S² is in the position indicated in the figure, in which it makes contact with the contacts 10, 10, all the sound detecting devices are inserted in series with each other in the input circuit of the amplifier. However, by shifting this switch so that it shall make contact with the contacts 11, 11—12, 12—13, 13— and 14, 14, while switch S¹ makes contact with 9, 9, only one of the sound detecting devices is inserted in the input circuit of the amplifier, viz., the sound detecting device M¹, M², M³ or M⁴, respectively.

It will thus be seen that when all the sound detecting devices are connected in series with each other, the arrangement will allow of an automatic detection of very faint acoustic vibrations owing to the fact that at least one of the sound detecting devices, namely, that one which happens to be in tune with the vibrations produced by the source of sound will respond to the acoustic vibrations, thereby causing the sound to be detected. Further, if it is desired to concentrate the attention upon a sound having a particular pitch, the sound detecting device unit tuned to such pitch may be connected to the amplifier with the exclusion of all the other sound detecting devices, by means of the switch S².

It will also be seen that the sensitiveness of the apparatus will also be increased owing to the fact that in the case of simultaneous acoustic vibrations emanating from the source of sound, several sound detecting devices will simultaneously respond to the different vibrations of respective frequencies, thereby causing an increased variation in the electric circuit.

I wish it to be understood that the mode of carrying the invention into effect and the various details hereinbefore referred to may be modified without in any way departing from the spirit of the invention.

What I claim is:—

1. A sound detecting device comprising an electrically heated thin conductor in combination with a sound box and with means for producing a small blast of air past the electrically heated thin conductor into the sound box, the said conductor being arranged between the said means and the sound box, as and for the purpose set forth.

2. A sound detecting device comprising an electrically heated thin conductor in combination with a sound box having a small opening and with means for producing a small blast of air past the electrically heated thin conductor and small opening into the sound box, the said conductor being arranged between the said means and the said small opening, as and for the purpose set forth.

3. A sound detecting device comprising an electrically heated thin conductor in combination with a sound box having a small opening and with a tubular member through which the blast is produced, the said conductor being arranged between the said small opening and tubular member, as and for the purpose set forth.

4. A sound detecting device comprising in combination an electrically heated thin conductor, a support of insulating material for the said conductor, an opening in the said support across which the said conductor is arranged to lie, a sound box having a small opening, and means for producing a small blast of air past said conductor into the sound box, the said support being arranged with its opening between the small opening in the box and the said means, as and for the purpose set forth.

5. A sound detecting device comprising in combination an electrically heated thin conductor, a support of insulating material for the said conductor, an opening in the said support across which the said conductor is arranged to lie, two thin metal disks attached to the latter support, an opening in each of the thin metal disks facing the opening in the said support, the two ends of the thin conductor being electrically connected to the two thin metal disks respectively, a sound box having a small opening, and means for producing a small blast of air past said conductor into the sound box, the said support being arranged with its opening between the small opening in the box and the said means, as and for the purpose set forth.

6. A sound detecting device comprising in combination an electrically heated thin conductor, an open frame of insulating material, teeth on the said frame for the reception of the thin conductor, and means for producing a small blast of air past said conductor into the sound box, as and for the purpose set forth.

7. A sound detecting device comprising in combination an electrically heated thin conductor, a support of insulating material for the said conductor, an opening in the said support, two thin metal disks attached to the latter support, an opening in each of the thin metal disks facing the opening in the said support, the two ends of the thin conductor being electrically connected to the two thin metal disks respectively, two metal plates in metallic contact with the two thin metal disks respectively, openings in the metal plates opposite the opening in the support of insulating material, a sound box, and means for producing a small blast of air past the thin conductor into the sound box, as set forth.

8. A sound detecting device comprising in combination an electrically heated thin conductor, a support of insulating material for the said conductor, an opening in the said support, two thin metal disks attached to the two ends of the thin conductor being electrically connected to the two thin metal disks respectively, two metal plates in metallic contact with the two thin metal disks respectively, openings in the metal plates opposite the opening in the support of insulating material, contact terminals on the two metal plates, a sound box and means for producing a small blast of air past the thin conductor into the sound box, as set forth.

9. A sound detecting device comprising in combination an electrically heated thin conductor, a support of insulating material for the said conductor, an opening in the said support, two thin metal disks attached to the latter support, an opening in each of the thin metal disks facing the opening in the said support, the two ends of the thin conductor being electrically connected to the two thin metal disks respectively, two metal plates in metallic contact with the two thin metal disks respectively, openings in the metal plates opposite the opening in the support of insulating material, a tubular member on one of the metal plates in communication with the opening therein, and a sound box, as set forth.

10. A sound detecting device comprising a sound box, a small opening in the latter, a frame attached to the sound box, a small opening in the said frame, an electrically heated thin conductor, a support of insulating material for the said conductor, an opening in the said support, two thin metal disks attached to the latter support, an opening in each of the thin metal disks facing the opening in the said support, the two ends of the thin conductor being electrically connected to the two thin metal disks respectively, two metal plates in metallic contact with the two thin metal disks respectively, and openings in the metal plates opposite the opening in the support of insulating material, the latter support with the thin conductor thereon and with the two metal disks attached thereto, together with the metal plates, being mounted on the frame attached to the sound box, as set forth.

11. A sound detecting device comprising an electrically heated thin conductor in combination with a sound box having a small opening, the volume of which sound box is capable of being varied, and with means for producing a small blast of air past the electrically heated thin conductor into the sound box, the said conductor being arranged between the said means and the said small opening, as and for the purpose set forth.

12. In combination a plurality of differently tuned sound detecting devices, each sound detecting device comprising an electrically heated thin conductor, a sound box having a small opening, and means for producing a small blast of air past the electrically thin heated conductor into the sound box, the said conductor being arranged between the said means and the said small opening, and the plurality of sound boxes being capable of being adjusted so as to have different volumes, thereby constituting a series of open resonators of different pitch as and for the purposes set forth.

In testimony whereof I have signed my name to this specification.

WILLIAM SANSOME TUCKER.